W. F. MILLS.
MACHINE FOR MAKING CONCRETE BLOCKS.
APPLICATION FILED JULY 13, 1908.

929,459.

Patented July 27, 1909.
6 SHEETS—SHEET 2.

Witnesses:
George Oltsch
G. M. Cole

William F. Mills
Inventor
By ........... Atty.

W. F. MILLS.
MACHINE FOR MAKING CONCRETE BLOCKS.
APPLICATION FILED JULY 13, 1908.

929,459.

Patented July 27, 1909.
6 SHEETS—SHEET 4.

Witnesses:
George Oltsch
G. M. Cole.

William F. Mills.
Inventor
By
Atty.

W. F. MILLS.
MACHINE FOR MAKING CONCRETE BLOCKS.
APPLICATION FILED JULY 13, 1908.

929,459.

Patented July 27, 1909.
6 SHEETS—SHEET 5.

Witnesses:
George Oltach
G. M. Cole

William F. Mills.
Inventor
By
Atty.

W. F. MILLS.
MACHINE FOR MAKING CONCRETE BLOCKS.
APPLICATION FILED JULY 13, 1908.

929,459.

Patented July 27, 1909.
6 SHEETS—SHEET 6.

Witnesses:
George Oltsch
G. M. Cole

William F. Mills.
Inventor
By
Atty.

UNITED STATES PATENT OFFICE.

WILLIAM F. MILLS, OF SOUTH BEND, INDIANA.

MACHINE FOR MAKING CONCRETE BLOCKS.

No. 929,459.

Specification of Letters Patent.

Patented July 27, 1909.

Application filed July 13, 1908. Serial No. 443,256.

*To all whom it may concern:*

Be it known that I, WILLIAM F. MILLS, a citizen of the United States, residing at South Bend, in the county of St. Joseph and State of Indiana, have invented certain new and useful Improvements in Machines for Making Concrete Blocks, of which the following is a specification.

This invention relates to machines for making concrete blocks, and has for its objects to improve the construction and increase the efficiency and utility of devices of this character.

Another object of the invention is to provide a device of this character wherein the molding box is adapted to be tilted after the molding operations are completed to place the molded block in more convenient position for the removal of the cores, and for the removal of the block to the drying room or platform.

Another object of the invention is to provide a device of this character wherein the mold is arranged to be tilted and to hold the cores in position and to prevent their displacement during the molding operations.

With these and other objects in view the invention consists in certain novel features of construction as hereafter shown and described and specifically pointed out in the claims, and in the drawings is shown the preferred embodiment of the invention, but it will be understood that changes may be made in the construction within the scope of the appended claims without departing from the principle of the invention or sacrificing any of its advantages.

The improved device comprises a supporting frame 10 having transverse studs on which a mold box is arranged to tilt, as hereafter explained. The frame may be of any required form or size and of any desired material, but will preferably be of metal and of sufficient strength to withstand the strains to which it will be subjected.

Bolted at 11 to the rear of the frame 10 is the rear side 12 of the mold box having spaced apertures 13 therein to receive and support the inner ends of the cores when the latter are in operative position.

Figure 11:
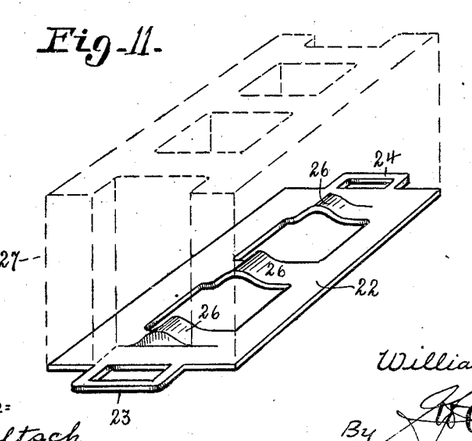
Fig. 11 is a perspective view showing the supporting plate for the block in full lines and the molded block in dotted lines.

Connected to the frame 10 and spaced from the rear member 12 are studs 14—15 and swinging upon these studs is a frame comprising spaced side members 16—17 and a transverse plate 18 and with a vertical extension 19 forming the front support of the mold box, the member 19 having supporting ribs 20 and with apertures to receive the core members of the mold. Bearing upon the plate 18 is another plate 21 which constitutes the bottom of the mold box, and bearing against the front member 19 of the mold box is a plate 22 which constitutes the front of the mold box, the plate 22 having spaced apertures to receive the core members and with the hand grips 23—24 at the ends, as shown in Fig. 11, which shows this plate in perspective and detached. The plate 22 is utilized to support the molded block after its completion, and the handles enable it to be conveniently carried from the machine to the seasoning or drying platform, as hereafter described. The plate 22 is also provided with elevated portions 26 at the ends and between the core apertures, to form recesses in the blocks.

Depending from the ends of the members 16—17 are lugs 28—29, and connected to these lugs are spaced guide rods 30—31, the rod 30 extended at one end into a handle 33, to enable the mold to be manually tilted.

Disposed between the members 16—17 is a frame 34 having depending lugs 35 carrying a handle rod 36, the frame having lateral extensions 37 to engage respectively around the guide rods 30—31, the frame 34 with its handle rod 36 being thus slidably coupled to the guide rods, and thereby movable beneath the mold box.

Connected by bolts 39 to the frame 34 is a plate 40 having a handle 43 and carrying the mold members 41—42, the member 40 and the mold members 41—42 being preferably integral or in one casting, as shown.

Figure 1:
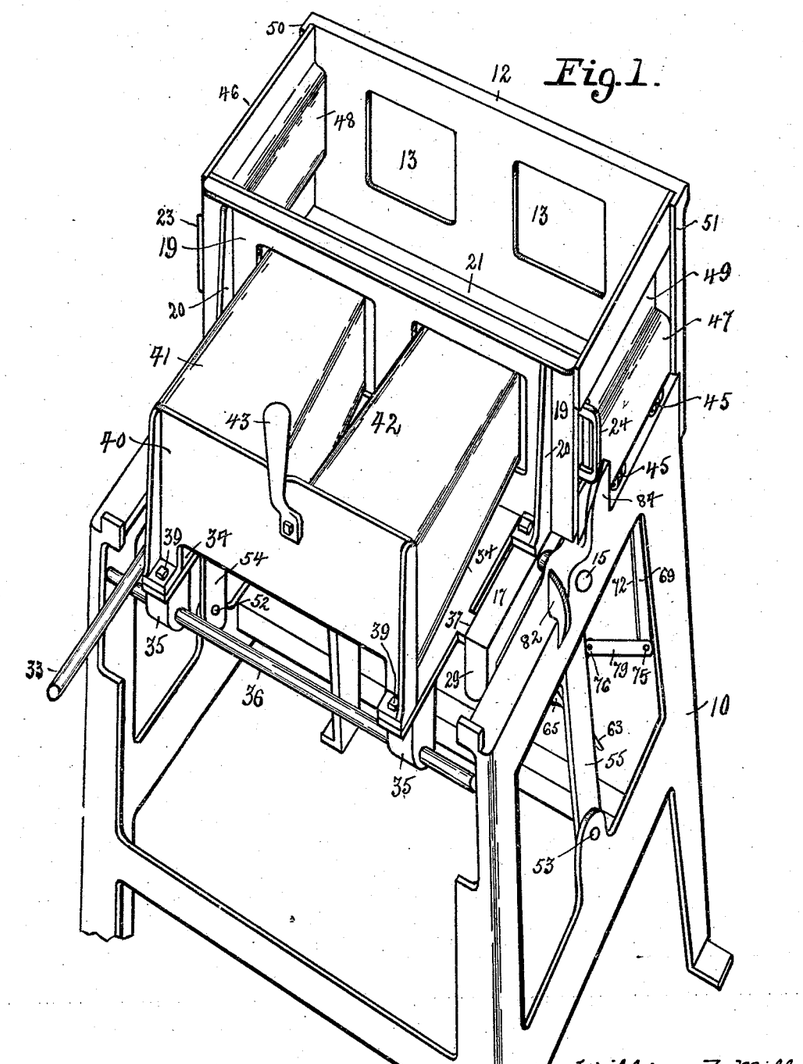
—Figure 1 is a perspective view of the improved apparatus with the cores in withdrawn position.
Figure 2:
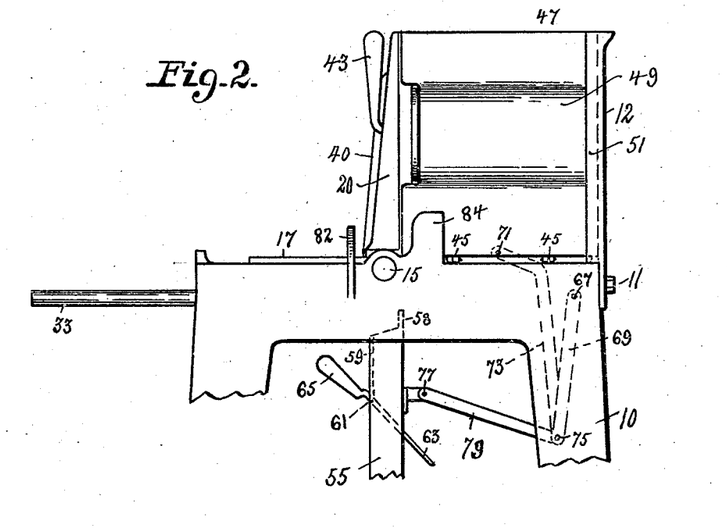
Fig. 2 is an end elevation of the upper portion of the device.

Hinged at 44—45 to the bottom 21 of the mold box are end members 46—47 of the mold box, the latter having inward extensions 48—49 to form the recesses in the ends of the blocks. The rear members 12 of the mold box structure are formed with stop ribs 50—51 at the ends to engage the end members 46—47, as shown in Figs. 1 and 2, when the mold box is in position to receive the material.

Pivoted at 52—53 to the frame 10 are arms 54—55, the arm 54 having spaced inwardly extending flanges at 56—57 at its free end, and the arm 55 having similar flanges 58—59 extending inwardly from its free end, the terminals of the handle rod 36 extending between the flanges.

Pivoted at 60—61 to the arm 54—55 are plates 62—63 forming swinging continuations of the flanges 57—59, the plates 62—63 having weighted extensions 64—65, the object to be hereafter explained.

Pivoted at 66—67 to the frame 10 are links 68—69, and pivoted at 70—71 to the transverse plate 18 are links 72—73, the latter pivotally united at 74—75. Pivoted at 76—77 to the arms 54—55 are links 78—79, the latter in turn swinging upon the pivots 74—75. By this arrangement the cores 41—42 will be supported until the cores and their supporting frame have been fully tilted as hereafter explained.

Figure 7:
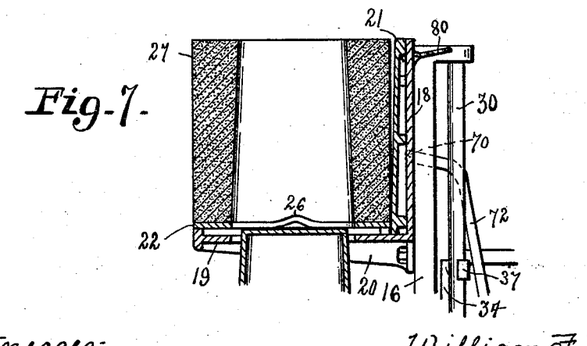
Fig. 7 is a sectional detail with the bottom member of the mold box withdrawn from engagement with the molded block.
Figure 8:
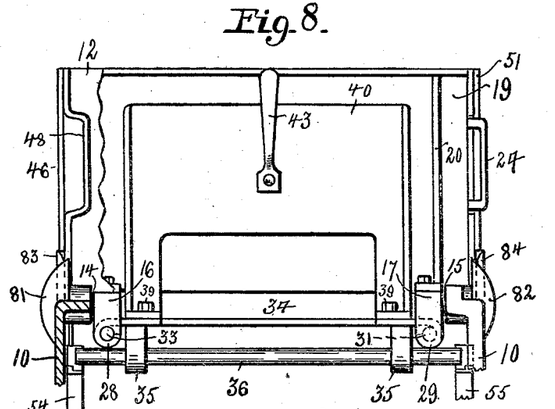
Fig. 8 is a front elevation of the upper portion of the machine, partly in section.

The bottom plate 21 is formed thickest at the edge next the side member 19, and is supported at its thinner edge by a lever 80, the lever operating to hold the member 21 in its inward position during the molding operations, and to withdraw the plate when the finished block is to be removed, as shown in Fig. 7, to completely release the block from all the mold members.

Figure 9:
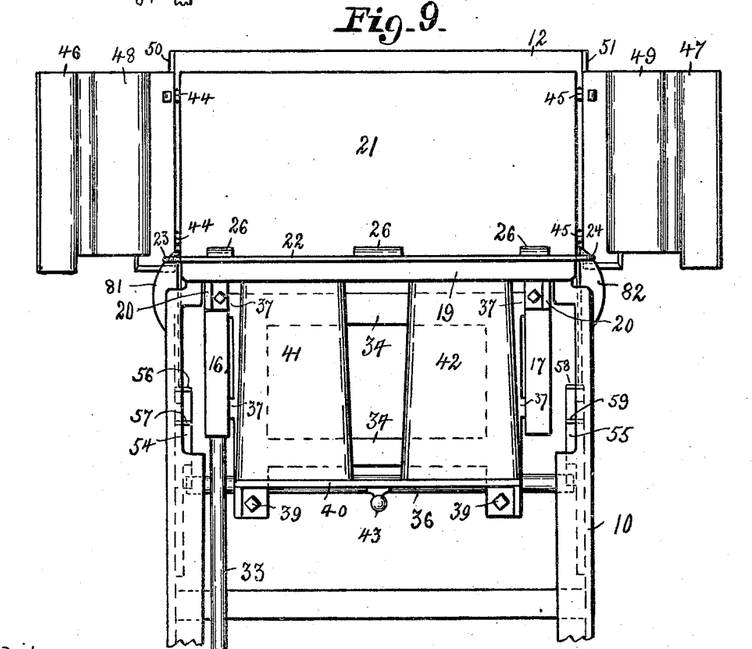
Fig. 9 is a view similar to Fig. 8 with the cores removed and the mold in open position.
Figure 10:
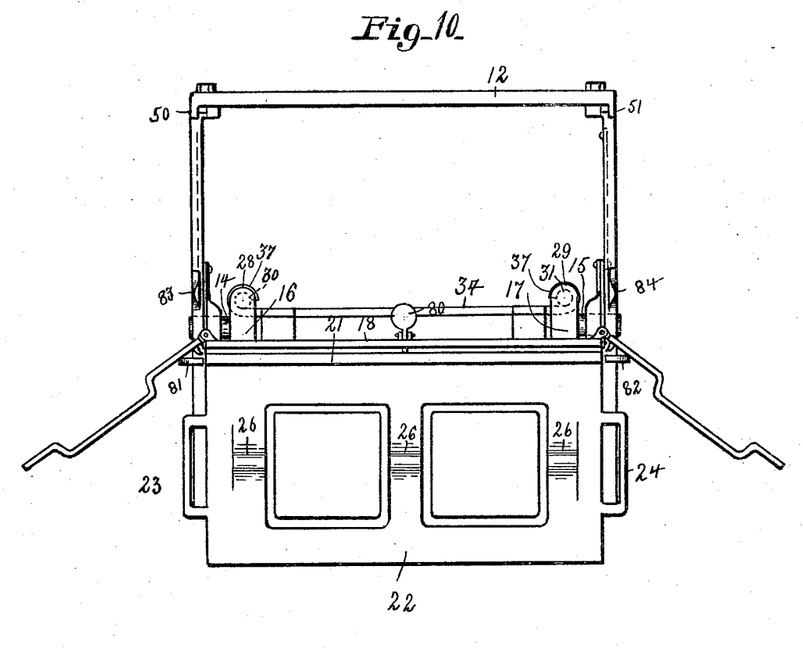
Fig. 10 is a plan view with the molded block removed.

The frame 10 is provided with lugs 81—82 with which the end members 46—47 of the mold box engage when the mold is tilted to open the same, as shown in Figs. 9 and 10, and the frame is likewise provided with lugs 83—84 with which the same members engage to close same when the mold is tilted into operative or closed position.

Figure 3:
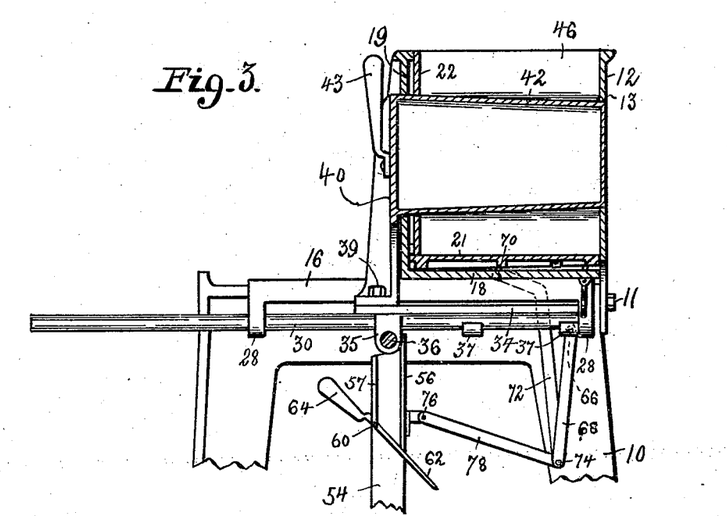
Fig. 3 is a section on the line 3—3 of Fig. 1 with the cores in their inward or operative position.
Figure 4:
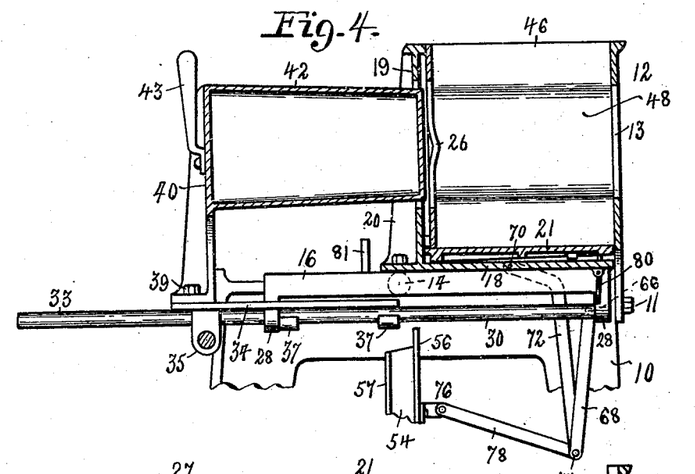
Fig. 4 is a view similar to Fig. 1 with the cores in withdrawn position.

Fig. 1 is a perspective view showing the mold box closed and the cores in withdrawn position, this being the proper position in starting the operation of the machine. The mold is now unobstructed and the plastic material is placed in the mold and tamped to a height in line with the bottom faces of the cores. The cores are then manually moved into the mold, as shown in Figs. 2 and 3, and the filling of the mold completed and tamped. When in this position the rod 36 engages by its ends between the flanges 56—57 on the arms 54—55, as shown in Fig. 3, the arms 54—55 being operated by the links 68—72—78 when the mold is tilted. When the mold is tilted by means of the rod 33 the ends of rod 36 enter between the flanges and by shifting of the arms the cores are caused to be gradually withdrawn from the mold.

Figure 5:
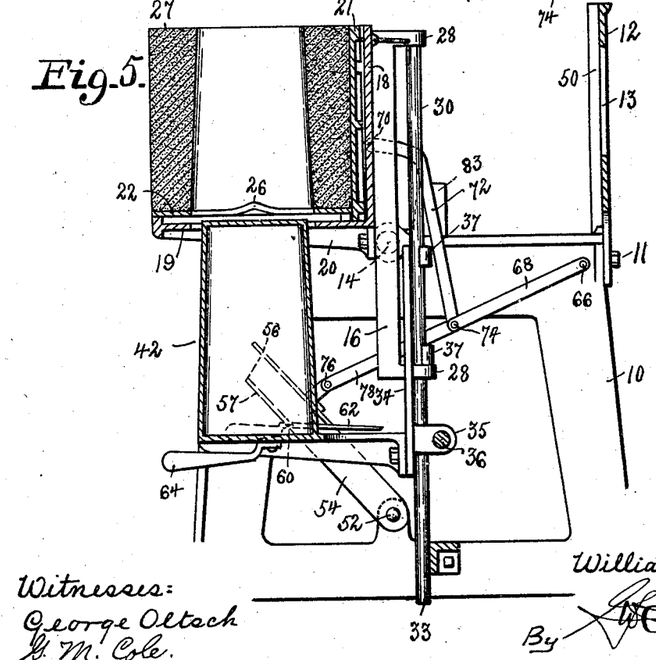
Fig. 5 is a view similar to Figs. 3 and 4, showing the mold box in full tilted position, and with the core withdrawn.
Figure 6:
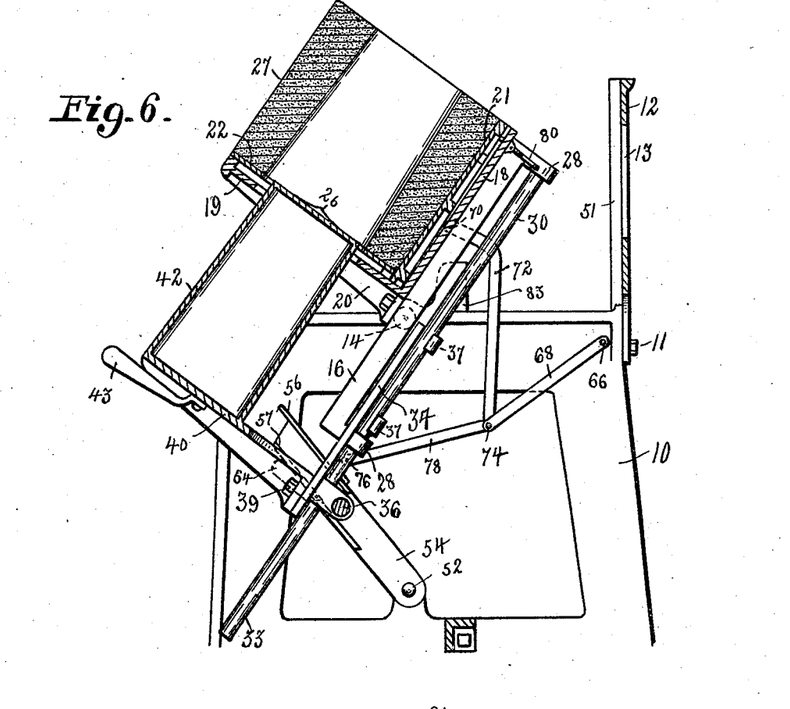
Fig. 6 is a view similar to Figs. 3, 4 and 5 showing the mold box partly tilted.

Fig. 6 shows the function of the weighted flanged extension 62 which elongates the flange to which it is pivoted so that the cores will be supported until the mold has been fully tilted. After the ends of the rod 36 pass beyond the member 62, as shown in Fig. 5 the weight on the member 62 shifts the latter into its original position, so that the rod 36 will entirely clear the same when the mold is raised, the rod 36 being controlled only and engaging with the arm 54—55 when the cores are being withdrawn from the mold.

In Figs. 5 and 7 the mold is shown completely tilted, and the facing plate 21, which may be of various designs and supported against the block to automatically engage the mold members and hold the same at right angles to the remainder of the mold members. The sides of the facing plate converge toward one edge, so that by raising the outer end of the lever 80 the plate may be pushed back against the base plate of the mold to leave the molded block completely free on all sides. The block now rests free upon the pallet 22 and ready for the "off bearer". In tilting the mold as already described, the hinged ends 46—47 engage the curved fixed members 81—82 and cause such ends to swing open, as shown in Figs. 9 and 10, the edges of the mold being beveled to deflect the same outward when engaging with the upper pointed ends of the members. After the molded block is removed a new pallet 22 is positioned and the operator raises the mold in position shown in Fig. 1 by taking hold of the handle 43, and the tilting lever 3 when the same comes into reach. During the raising action the mold ends engage the fixed members 83—84, which are beveled on their inner faces, and cause the ends 46—47 to close into proper position. Each mold end is provided on its inner face with a curved nose which enters the openings in the ends of the face plate 21 as the ends close, causing said plate to be raised in the proper position, and so holding it until the mold is tilted and the mold ends open.

It will be noted that the mold ends bulge inwardly at their centers, the bulge slightly shorter than the remainder of the end, to permit the bulge to pass over the pallet handle and lock the same in position, as shown in Figs. 1 and 9.

What is claimed is:—

1. In a device of the class described, a supporting frame, a frame swinging upon said supporting frame, a sectional mold carried by said frame, a frame slidable upon the swinging frame, core elements carried by said slidable frame and movable into and out of said mold, means whereby the swinging frame may be swung upon its axis, and means engaged by the sliding frame during swinging movement of the swinging frame for operation to support the cores during said swinging movement and permit of a gradual withdrawal of the cores from the mold during the swinging movement.

2. In a device of the class described, a supporting frame, one member of a mold being carried by said supporting frame and provided with apertures, a frame swinging upon said supporting frame, the remaining side and bottom members of the mold being carried by said swinging frame, a frame slidable upon said swinging frame, core elements carried by said slidable frame and movable through said apertures, means whereby the swinging frame may be swung upon its axis, and means engaged by the sliding frame for operation to support said cores and permit of their gradual withdrawal from said apertures during the swinging movement of the swinging frame.

3. In a device of the class described, a stationary supporting frame, one member of a mold carried by said stationary frame, a frame swinging upon said stationary frame, the remaining members of the mold carried by said swinging frame, guide rods spaced apart and carried by said swinging frame, a frame having clips engaging said rods and slidable thereby upon the swinging frame, a core carried by the slidable frame and movable into and out of the mold and means to permit of a gradual withdrawal of the core element from the mold during the swinging movement of the swinging frame.

4. In a device of the class described, a supporting frame, a frame swinging upon said supporting frame, a sectional mold whose parts are carried by said frames, a frame slidable upon said swinging frame, core elements carried by said slidable frame and movable into and out of said mold, means whereby the swinging frame may be swung upon its axis, means engaged by the sliding frame for operation to support said cores during the swinging movement of the swinging frame, and means whereby said core engaging means may be released from the sliding frame when the swinging frame has been swung to its outward limit of movement.

5. In a device of the class described, a supporting frame, one side member of a mold being carried by said supporting frame and provided with apertures, a frame swinging upon said supporting frame, the remaining side and bottom members of the mold being carried by said swinging frame with the side member of the latter frame provided with apertures for alinement with the apertures of the other side member, a frame slidable upon said swinging frame, core elements carried by said slidable frame and movable through said apertures, means whereby the swinging frame may be swung upon its axis, means engaged by the sliding frame for operation to support the core elements and permit of their withdrawal from said apertures gradually during the outward swing of said swinging frame, and means whereby said core supporting means may be released automatically from engagement with said sliding frame when the swinging frame has reached the limit of its outward movement.

6. In a device of the class described, a supporting frame, a frame swinging upon said supporting frame, sectional mold elements carried by said frames, a frame slidable upon said swinging frame, core elements carried by said slidable frame and movable into and out of the mold, means whereby the swinging frame may be swung upon its axis, and arms pivotally mounted in the supporting frame and arranged for engagement by said sliding frame when the swinging frame is swung upon its axis to support the core elements and permit of their gradual withdrawal from the mold during the swinging movement of the swinging frame.

7. In a device of the class described, a stationary supporting frame, one side member of a mold carried by said stationary frame, a frame swinging upon said stationary frame, the remaining side and the bottom member of the mold carried by said swinging frame, the end members of the mold hingedly united to said swinging frame, and means for moving the bottom member of the mold outwardly away from the completed article when the swinging frame has been moved in one direction upon its axis.

8. In a device of the class described, a stationary supporting frame, one side member of a mold carried by said stationary frame, a frame swinging upon said stationary frame, the remaining side and the bottom member of the mold being carried by said swinging frame, the end members of the mold being hingedly united to said swinging frame, a frame slidable upon said swinging frame, core elements carried by said slidable frame and movable into and out of the mold, means for moving the bottom member of the mold outwardly away from the completed article when the swinging frame has been moved in one direction upon its axis, arms pivotally mounted in the supporting frame and arranged for engagement by said sliding frame when the swinging frame is swung upon its axis to support the core elements and permit of their gradual withdrawal from the mold during the swinging of the swinging frame, and means carried by each of said arms for coöperation therewith and to permit of an automatic release of the arms from engagement with the sliding frame when the swinging frame has reached the limit of its outward swing.

9. In a device of the class described, a supporting frame, one side member of a mold carried by said supporting frame and provided with apertures, a frame swinging upon said supporting frame, the remaining side and bottom members of the mold being carried by said swinging frame, a frame slidable upon said swinging frame, core elements carried by said slidable frame and movable through said apertures, means whereby the swinging frame may be swung upon its axis, arms pivotally mounted upon the supporting frame and each provided at its upper end with oppositely disposed flanges for engagement by said slidable frame when the swinging frame is swung upon its axis whereby the core elements may be supported and permitted to gradually pass outwardly through said apertures when the swinging frame is swung upon its axis, and a member pivoted upon each arm and coöperating with one of the flanges thereof for coöperation with the latter and also to permit of a release of the arms from engagement with the sliding frame when the swinging frame has reached the limit of its outward swing.

10. In a device of the class described, a supporting frame, one side member of a mold being carried by said supporting frame and provided with apertures, a frame swinging upon said supporting frame, the remaining side and bottom members of the mold being carried by said swinging frame with the side member thereof provided with apertures for alinement with the aforesaid apertures, a frame slidable upon said swinging frame, core elements carried by said slidable frame and movable through said apertures, means whereby the swinging frame may be swung upon its axis, means arranged for engagement by said sliding frame for operation to support the core elements and permit of their gradual withdrawal from said apertures during the outward swinging movement of the swinging frame, means to effect an automatic release of said core supporting means from the sliding frame when the swinging frame has been swung to its outward position, and means whereby the end members of the mold may be thrown into and out of operative relation with the sides of the mold during the swinging movement of said swinging frame.

11. In a device of the class described, a stationary supporting frame, one side member of a mold being carried by said stationary frame and provided with transverse apertures, the remaining members of the mold being carried by said swinging frame, the side member of said remaining mold members being provided with apertures for alinement with the apertures of the first mentioned side member, a slidable frame, cores carried by the slidable frame for passage into and out of the apertures of the side members, and pivoted arms for engagement with the cores to support the latter and permit of their gradual withdrawal from said apertures when the swinging frame is swung outwardly.

12. In a device of the class described, a stationary supporting frame, one member of a mold carried by said stationary frame, a frame swinging upon said stationary frame, the remaining members of a mold carried by said swinging frame, a frame slidable upon said swinging frame, core elements carried by said slidable frame, arms swinging from said stationary frame and provided with spaced flanges at their free ends, weighted movable members carried by said arms and forming continuations of one of said flanges, links swinging from said stationary frame, links swinging from said swinging frame, links swinging from said arms, and links pivotally united at their free ends, and an element depending from said slidable frame and engaging between the flanges of said swinging arms.

13. In a device of the class described, a stationary supporting frame, one side member of a mold being carried by said stationary frame and provided with transverse apertures, the remaining members of the mold being carried by said swinging frame, the side member of said remaining mold members being provided with apertures for alinement with the apertures of the first mentioned side member, a slidable frame, cores carried by the slidable frame for passage into and out of the apertures of the side members, means whereby the swinging frame may be swung upon its axis, swinging means arranged for engagement by the sliding frame for operation to support the cores and permit of a gradual withdrawal of the latter from said apertures when the swinging frame is swung in one direction upon its axis, and means whereby said swinging means may be automatically released from engagement with the sliding frame when the swinging frame has reached the limit of its swinging movement.

14. In a device of the class described, a stationary supporting frame, one side member of a mold being carried by said stationary frame and provided with transverse apertures, the remaining members of the mold being carried by said swinging frame, the side member of said remaining mold members being provided with apertures for alinement with the apertures of the first mentioned side member, a slidable frame, cores carried by the slidable frame for passage into and out of the apertures of the side members, means whereby the swinging frame may be swung upon its axis, means arranged for automatic operation to engage the cores to support them and permit of their gradual withdrawal from the mold when the swinging frame is swung upon its axis, means whereby said core supporting means may be automatically released when the swinging frame has reached the limit of its swinging movement, and means for automatically throwing the end members of the mold into and out of operative relation with the mold during the swinging movement of said swinging frame.

15. In a device of the class described, a stationary supporting frame, one side member of a mold being carried by said stationary frame and provided with transverse apertures, a swinging frame, the remaining members of the mold being carried by said swinging frame and the side member of said remaining mold member being provided with apertures for alinement with the apertures of the first mentioned side member, a facing plate mounted in the mold and provided with apertures for alinement with the aforesaid apertures, said facing plate being disposed in alinement with the side member of the mold and adjacent thereto, a slidable frame, core elements mounted upon the slidable frame for movement into and out of said apertures, means whereby the swinging frame may be swung upon its axis, means for automatic operation to engage the cores to support them and permit of their gradual withdrawal from the mold during the swinging movement of the swinging frame, and means to effect an automatic release of said core supporting means.

16. In a device of the class described, a stationary supporting frame, one side member of a mold being carried by said stationary frame and provided with transverse apertures, a swinging frame, the remaining members of the mold being carried by said swinging frame and the side member of said remaining mold member being provided with apertures for alinement with the apertures of the first mentioned side member, a facing plate mounted in the mold and provided with apertures for alinement with the aforesaid apertures, said facing plate being disposed in alinement with the side member of the mold and adjacent thereto, a slidable frame, core elements mounted upon the slidable frame for movement into and out of said apertures, means whereby the swinging frame may be swung upon its axis, means for operation automatically during the swinging movement to support the cores and permit of their gradual withdrawal from the mold, means for effecting an automatic release of said core supporting means, and means whereby the side and end members of the mold may be thrown away from the completed article when the latter is disposed upon said facing plate incident to the swinging movement of said swinging frame.

17. In a device of the class described, a stationary supporting frame, one side member of a mold being carried by said stationary frame and provided with transverse apertures, a swinging frame, the remaining members of the mold being carried by said swinging frame and the side member of said remaining mold member being provided with apertures for alinement with the apertures of the first mentioned side member, a facing plate mounted in the mold and provided with apertures for alinement with the aforesaid apertures, said facing plate being disposed in alinement with the side member of the mold and adjacent thereto, a slidable frame, core elements mounted upon the slidable frame for movement into and out of said apertures, means whereby the swinging frame may be swung upon its axis, means for automatic operation to support the cores and permit of their gradual withdrawal during the swinging movement of the swinging frame, means to automatically release said core supporting means, means whereby the side and end members of the mold may be thrown away from the completed article when the latter is disposed upon said facing plate incident to the swinging of the swinging frame, the facing plate having raised portions to provide cavities in the molded article, and means whereby the side and end members of the mold may be automatically assembled when the swinging frame is returned to its operative position.

18. In a device of the class described, a stationary supporting frame, a swinging frame, a mold having parts mounted upon the stationary and the swinging frames, core elements for coöperation with the mold, means for swinging said swinging frame upon its axis and consequently the parts of the mold mounted thereupon and also simultaneously move said core elements, means operative automatically to engage the core elements to support them and permit of their gradual withdrawal during the swinging movement of the swinging frame, and means to effect a release of said core supporting means.

19. In a device of the class described, a stationary supporting frame, a swinging frame, a mold having parts mounted upon the stationary and the swinging frames, core elements for coöperation with the mold, means for swinging said swinging frame upon its axis and consequently the parts of the mold mounted thereupon and also simultaneously move said core elements, means to support the core elements and permit of their gradual withdrawal from the mold during the swinging movement of said swinging frame, means whereby the core supporting means may be automatically released, and means whereby the end members of the mold may be thrown out of coöperative relation with the mold during the swinging movement of the swinging frame.

20. In a device of the class described, a supporting frame, a mold constructed and arranged for swinging movement in said supporting frame, core elements movable into and out of said mold, means constructed and arranged to support said core elements and permit of their gradual withdrawal from the mold during the swinging movement of the latter, and means to effect an automatic release of said core supporting means.

21. In a device of the class described, a supporting means, a mold mounted for swinging movement in said supporting means, core elements movable into and out of the mold, arms pivoted on said supporting means for engagement with the core elements to support the latter and permit of their gradual withdrawal from the mold during the swinging movement of the mold, and a member pivoted on each pivoted arm for coöperation therewith to support the core elements and also to effect an automatic release of the arms.

22. In a device of the class described, a supporting means, one member of a mold carried by said supporting means, a frame swinging upon said supporting means, the remaining members of the mold being carried by said swinging frame, a frame slidable upon the swinging frame, core elements carried by the slidable frame, arms pivotally mounted upon said supporting means and provided with spaced flanges, a member carried by each arm to form a continuation of one of the flanges thereof, said sliding frame having an element engaging the last mentioned flange of each arm and the member forming a continuation thereof, whereby said arms may be operated to support the core elements and permit of their gradual withdrawal during the swinging movement of said swinging frame.

23. In a device of the class described, a supporting means, one member of a mold carried by said supporting means, a frame swinging upon said supporting means, the remaining members of the mold being carried by said swinging frame, a frame slidable upon the swinging frame, core elements carried by the slidable frame, arms pivotally mounted upon said supporting means and provided with spaced flanges, a member carried by each arm to form a continuation of one of the flanges thereof, whereby said arms may be operated to support the core elements and permit of their gradual withdrawal during the swinging movement of said swinging frame, and means to effect an automatic release of said arms from engagement with the sliding frame.

24. In a device of the class described, a supporting means, one member of a mold carried by said supporting means, a frame swinging upon said supporting means, the remaining members of the mold being carried by said swinging frame, a frame slidable upon the swinging frame, core elements carried by the slidable frame, arms pivotally mounted upon said supporting means and provided with spaced flanges, a member carried by each arm to form a continuation of one of the flanges thereof, said sliding frame having an element engaging the last mentioned flange of each arm and the member forming a continuation thereof, whereby said arms may be operated to support the core elements and permit of their gradual withdrawal during the swinging movement of said swinging frame, links swinging from said stationary frame, links swinging from said swinging frame, links swinging from said arms, and links pivotally united at their free ends.

25. In a device of the class described, a supporting means, one member of a mold carried by said supporting means, a frame swinging upon said supporting means, the remaining members of the mold being carried by said swinging frame, a frame slidable upon the swinging frame, core elements carried by the slidable frame, arms pivotally mounted upon said supporting means and provided with spaced flanges, a member carried by each arm to form a continuation of one of the flanges thereof, said sliding frame having an element engaging the last mentioned flange of each arm and the member forming a continuation thereof, whereby said arms may be operated to support the core elements and permit of their gradual withdrawal during the swinging movement of said swinging frame, means to effect an automatic release of said arms from engagement with the sliding frame, links swinging from said stationary frame, links swinging from said swinging frame, links swinging from said arms, and links pivotally united at their free ends.

In testimony whereof I affix my signature, in presence of two witnesses.

WILLIAM F. MILLS.

Witnesses:
  GEORGE OLTSCH,
  G. M. COLE.